(12) United States Patent
Tao

(10) Patent No.: US 12,229,899 B2
(45) Date of Patent: Feb. 18, 2025

(54) TRACKING DEVICE, HEAD-MOUNTED DISPLAY DEVICE, AND VIRTUAL REALITY SYSTEM

(71) Applicant: HTC Corporation, Taoyuan (TW)

(72) Inventor: Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 335 days.

(21) Appl. No.: 17/817,355

(22) Filed: Aug. 4, 2022

(65) Prior Publication Data

US 2023/0177780 A1 Jun. 8, 2023

Related U.S. Application Data

(60) Provisional application No. 63/264,956, filed on Dec. 6, 2021.

(51) Int. Cl.
*G06T 19/00* (2011.01)
*G02B 27/01* (2006.01)

(52) U.S. Cl.
CPC ........ *G06T 19/006* (2013.01); *G02B 27/0101* (2013.01); *G02B 2027/014* (2013.01); *G02B 27/017* (2013.01)

(58) Field of Classification Search
CPC ........... G06T 19/006; G06T 7/70; G06T 7/73; G06T 7/74; G06T 7/75; G02B 27/0101; G02B 27/017; G02B 2027/0187; G06V 10/95; G06V 20/20
See application file for complete search history.

(56) References Cited

U.S. PATENT DOCUMENTS

| 10,152,141 | B1 | 12/2018 | Lohse et al. |
| 10,185,775 | B2 * | 1/2019 | Schmalstieg ....... G06F 16/5866 |
| 10,565,731 | B1 * | 2/2020 | Reddy ..................... G06F 3/012 |
| 11,568,562 | B1 * | 1/2023 | D'Amico ................ G01S 5/163 |
| 2014/0267234 | A1 * | 9/2014 | Hook .................... G06T 19/006 345/419 |
| 2015/0205135 | A1 | 7/2015 | Border et al. |
| 2016/0179830 | A1 * | 6/2016 | Schmalstieg ....... G06F 16/2264 707/722 |
| 2017/0011555 | A1 | 1/2017 | Li et al. |
| 2017/0161956 | A1 | 6/2017 | Fu et al. |

(Continued)

FOREIGN PATENT DOCUMENTS

| TW | 202009786 A | 3/2020 |
| TW | 202105133 A | 2/2021 |

OTHER PUBLICATIONS

The office action of the related U.S. Appl. No. 17/817,353 issued on Mar. 18, 2024.
(Continued)

*Primary Examiner* — King Y Poon
*Assistant Examiner* — Vincent Peren
(74) *Attorney, Agent, or Firm* — CKC & Partners Co., LLC

(57) ABSTRACT

A tracking device, communicatively connected to a HMD device (head-mounted display device), is disclosed. The tracking device includes a client processor and a client memory. The client processor is configured to obtain an initial map from the HMD device. The client memory is configured to store the initial map. The client processor is further configured to update the initial map stored in the client memory to generate a client map according to a host bundle adjustment data sent by the HMD device.

19 Claims, 4 Drawing Sheets

(56) References Cited

U.S. PATENT DOCUMENTS

| | | |
|---|---|---|
| 2018/0365853 A1 | 12/2018 | Yang et al. |
| 2019/0244416 A1 | 8/2019 | Tamaoki et al. |
| 2019/0385370 A1 | 12/2019 | Boyapalle et al. |
| 2020/0027274 A1* | 1/2020 | Suzuki ................. G06T 19/006 |
| 2020/0158517 A1* | 5/2020 | Tadi ....................... G06T 7/248 |
| 2020/0363867 A1 | 11/2020 | Azimi et al. |

OTHER PUBLICATIONS

The office action of the related U.S. Appl. No. 17/817,353 issued on Nov. 22, 2023.
The office action of the related Taiwanese application No. TW111144045 issued on Jul. 11, 2023.
Office Action of related U.S. Appl. No. 17/817,353 issued on Dec. 29, 2022.

* cited by examiner

TRACKING DEVICE, HEAD-MOUNTED DISPLAY DEVICE, AND VIRTUAL REALITY SYSTEM

CROSS-REFERENCE TO RELATED APPLICATION

This application claims priority to U.S. Provisional Application Ser. No. 63/264,956, filed Dec. 6, 2021, which is herein incorporated by reference.

FIELD OF INVENTION

The present application relates to a tracking device, a head-mounted display device, and a virtual reality system. More particularly, the present application relates to a tracking device, a head-mounted display device, and a virtual reality system with a SLAM system.

BACKGROUND

In a SLAM (simultaneous localization and mapping) system, the drift will happen when the SLAM system is being used by a user for a long time. In a SLAM system with two different devices, for example, a SLAM system with a head-mounted display device and a tracking device, the drift of the head-mounted display device and the tracking device may be different, which causes the user to find the position of the tracking device being incorrect.

SUMMARY

The disclosure provides a tracking device. The tracking device is communicatively connected to a HMD device (head-mounted display device). The tracking device includes a client processor and a client memory. The client processor is configured to obtain an initial map from the HMD device. The client memory is configured to store the initial map. The client processor is further configured to update the initial map stored in the client memory to generate a client map according to a host bundle adjustment data sent by the HMD device.

The disclosure provides a HMD device. The HMD device is communicatively connected to a tracking device. The HMD device includes a host memory and a processor. The host memory is configured to store a SLAM module. The host processor is configured to: obtain an initial map with the SLAM module; send the initial map to the tracking device; obtain several host key frames; perform a bundle adjustment process according to several host key frames to generate a host bundle adjustment data; update the initial map to generate a host map according to the host bundle adjustment data; and send the host map to the tracking device for the tracking device to generate a client map by updating the initial map according to the host bundle adjustment data.

A virtual reality system includes a HMD device and a tracking device is disclosed. The tracking device is communicatively connected to the HMD device. The HMD device includes a host memory and a host processor. The host memory is configured to store a SLAM module. The host processor is configured to obtain an initial map with the SLAM module. The tracking device includes a client processor and a client memory. The client processor is configured to obtain the initial map from the HMD device. The client memory is configured to store the initial map. The host processor is further configured to: obtain several host key frames; perform a bundle adjustment process according to several host key frames to generate a host bundle adjustment data; update the initial map to generate a host map according to the host bundle adjustment data; and send the host bundle adjustment data to the client processor. The client processor is further configured to: update the initial map stored in the client memory to generate a client map according to the host bundle adjustment data.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
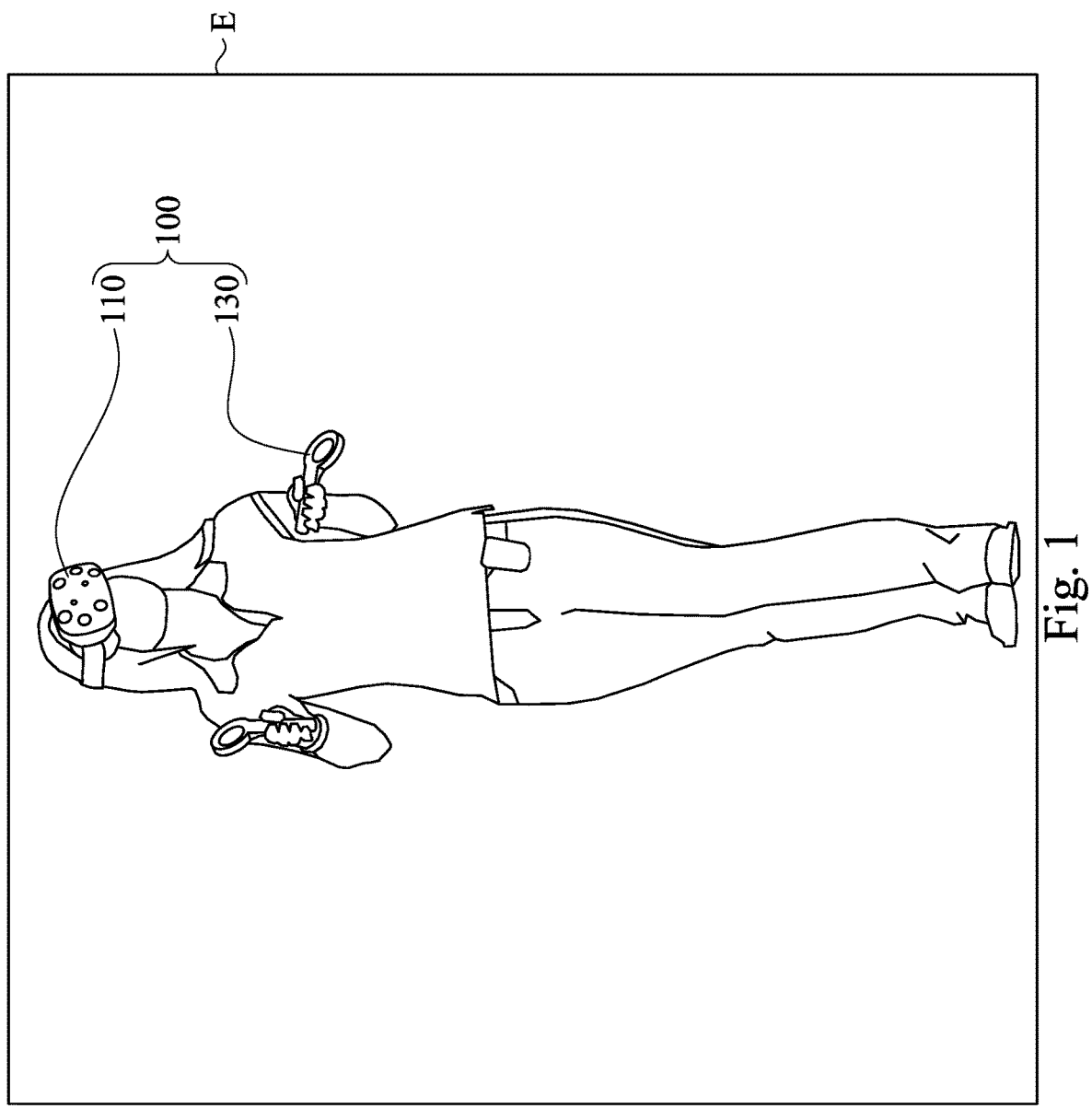
FIG. 1 is a schematic diagram illustrating a virtual reality (VR) system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a virtual reality (VR) system 100 according to some embodiments of the present disclosure. In some embodiments, the virtual reality system 100 is a SLAM system.

As shown in FIG. 1, the virtual reality system 100 includes a head-mounted display (HMD) device 110 and a tracking device 130. The HMD device 110 can be disposed on a VR headset, which is wearable on a user. When a user wears the VR headset, the HMD device 110 will cover visions of the user, and the HMD device 110 is configured to provide virtual reality visions to the user. In some embodiments, the tracking device 130 is a self-tracking device, which is held by the user and may be controlled by the user.

In some embodiments, the HMD device 110 works as a host device, and the tracking device 130 works as a client device. In some embodiments, the HMD device 110 and the tracking device 130 are communicatively connected to each other.

As shown in FIG. 1. The user is operating the virtual reality system 100 in an environment E. In some embodiments, the virtual reality system 100 constructs or updates a map of the unknown environment E while simultaneously keeping track of the location of the virtual reality system 100 within the environment E.

Figure 2:
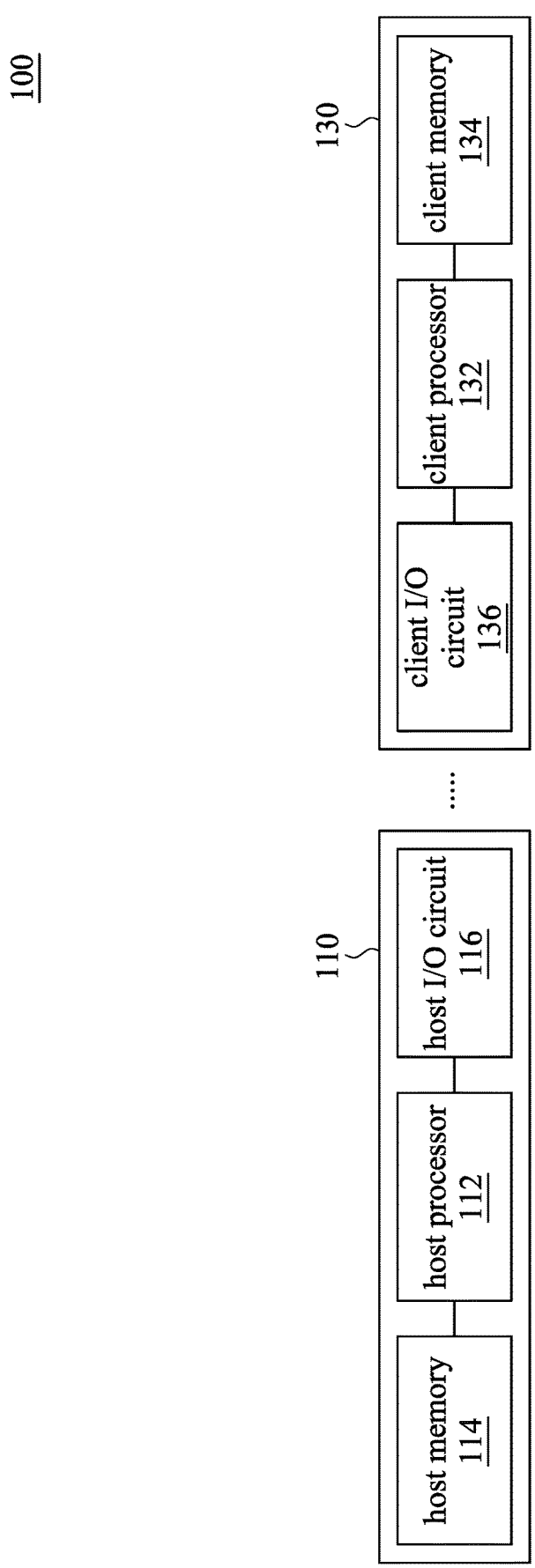
FIG. 2 is a schematic diagram illustrating the virtual reality system as illustrated in FIG. 1 according to some embodiments of the present disclosure.

Reference is made to FIG. 2. FIG. 2 is a schematic diagram illustrating the virtual reality system 100 as illustrated in FIG. 1 according to some embodiments of the present disclosure. As illustrated in FIG. 2, The HMD device 110 includes a host processor 112, a host memory 114, and a host I/O circuit 116. The host processor 112 and the host memory 114 are coupled to each other, and the host processor 112 and the host I/O circuit 116 are coupled to each other. The tracking device 130 includes a client processor 132, a client memory 134, and a client I/O circuit 136. The client processor 132 and the client memory 134 are coupled to each other, and the client processor 132 and the client I/O circuit 136 are coupled to each other.

In some embodiments, the HMD device 110 sends or receives information/data or signals through the host I/O circuit 116, and the tracking device 130 sends or receives information/data or signals through the client I/O circuit 136.

Figure 3:
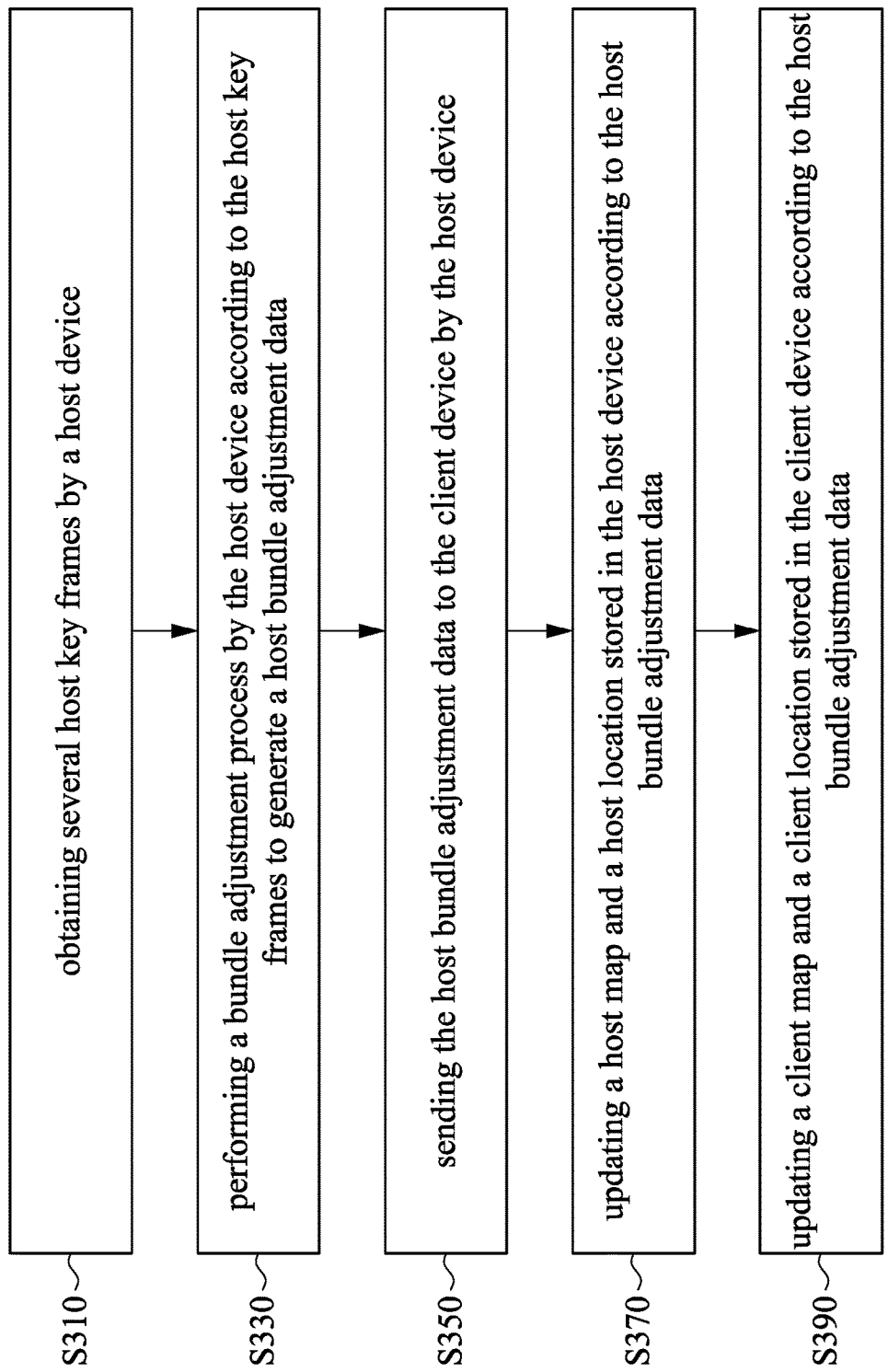
FIG. 3 is a flow chart diagram illustrating an adjusting method according to some embodiments of the present disclosure.

Reference is made to FIG. 3. FIG. 3 is a flow chart diagram illustrating an adjusting method 300 according to some embodiments of the present disclosure. The adjusting method 300 is suitable to be executed by the virtual reality system 100 in FIG. 1 and FIG. 2. The adjusting method 300 includes operations S310 to S390.

In operation S310, several host key frames are obtained by a host device. In some embodiments, operation S310 is operated by the host processor 112 of the HMD device 110 as illustrated in FIG. 2.

Reference is made to FIG. 1 and FIG. 2 at the same time. In some embodiments, in an initial stage of the virtual reality system 100, the host processor 112 of the HMD device 110 constructs an initial map of the environment E and obtains a host location of the HMD device 110 in the initial map. The HMD device 110 transfers the initial map to the tracking device 130. The client processor 132 of the tracking device 130 obtains a client location of the tracking device 130 in the initial map. The initial map is a 3D map of the environment E.

In some embodiments, the HMD device 110 stores the initial map in the host memory 114, and the initial map stored in the host memory 114 of the HMD device 110 works as a host map of the HMD device 110. In some embodiments, the tracking device 130 stores the initial map in the client memory 134, and the initial map stored in the client memory 134 of the tracking device 130 works as a client map of the tracking device 130.

In some embodiments, after the initial map is constructed, the HMD device 110 keeps detecting the environment E, and the HMD device 110 obtains several host key frames of the environment E. In some embodiments, the host key frames include several features of the environment E of the virtual reality system 100.

In some embodiments, the HMD device 110 stores the host key frames in the host memory 114.

In some embodiments, in operation S310, after the HMD device 110 obtains the host key frames of the environment E, the host processor 112 of the HMD device 110 sends the host key frames to the tracking device 130 through the host I/O circuit 116. After receiving the host key frames from the HMD device 110, the client memory 134 of the tracking device 130 stores the host key frames.

In operation S330, a bundle adjustment process is performed by the host device according to the host key frames to generate a host bundle adjustment data. In some embodiments, operation S330 is operated by the host processor 112 of the HMD device 110 as illustrated in FIG. 2.

A bundle adjustment method is used in a feature-based 3D reconstruction algorithm. It amounts to an optimization problem on the 3D structure and viewing parameters, to obtain a reconstruction which is optimal under certain assumptions regarding the observed image features. The host bundle adjustment data are data for updating the 3D map previously constructed. The bundle adjustment method is a common knowledge for the arts in the field and will be described in detail herein.

In some embodiments, the host processor 112 of the HMD device 110 performs the bundle adjustment process according to the host key frames obtained by the HMD device 110 and the client key frames obtained by the tracking device 130 to generate the host bundle adjustment data. In detail, in some embodiments, the tracking device 130 detects the environment E, obtains several client key frames of the environment E, and sends the client key frames to the HMD device 110. The HMD device 110 then generates the host bundle adjustment data according to the host key frames obtained by the HMD device 110 and the client key frames obtained by the tracking device 130.

In operation S350, the host bundle adjustment data is sent to the client device by the host device. In some embodiments, operation S350 is operated by the HMD device 110 as illustrated in FIG. 2. That is, the host processor 112 of the HMD device 110 sends the host bundle adjustment data to the tracking device 130.

In some embodiments, after receiving the host bundle adjustment data, the tracking device 130 stores the host bundle adjustment data in the client memory 134 of the tracking device 130.

In operation S370, a host map and a host location stored in the host device are updated according to the host bundle adjustment data. In some embodiments, operation S370 is performed by the host processor 112 of the HMD device 110 as illustrated in FIG. 2.

In some embodiments, in operation S370, the updated host map and host location of the HMD device 110 are stored in the host memory 114 of the HMD device 110.

In operation S390, a client map and a client location stored in the client device are updated according to the host bundle adjustment data. In some embodiments, operation S390 is performed by the client processor 132 of the tracking device 130 as illustrated in FIG. 2.

In some embodiments, in operation S390, the updated client map and the client location are stored in the client memory 134 of the tracking device 130.

In some embodiments, the tracking device 130 does not modify the host bundle adjustment data sent from the HMD device 110, so that the host map and the client map are aligned.

In some embodiments, the tracking device 130 generates a client bundle adjustment data for the tracking device 130 itself according to the client key frames obtained by the tracking device 130. With the client bundle adjustment data generated by the tracking device 130, the tracking device is more accurate when performing a self-tracking operation.

If both of the HMD device 110 and the tracking device 130 obtain their own key frames and perform their own bundle adjustment process, the drift of the HMD device 110 and the drift of the tracking device 130 may be different. On the other hand, with the adjusting method 300 in the present disclosure, a consistency between the host map stored in the host memory 114 and the client map stored in the client memory 134 is maintained with the host bundle adjustment data generated by the host device.

In detail, the host processor 112 maintains the consistency between the host map and the client map with the host bundle adjustment data, and the client processor 132 also maintains the consistency between the host map and the client map with the host bundle adjustment data.

Furthermore, even if the drift occurs in the virtual reality system 100, since the host map and the client map are updated with the same host bundle adjustment data, the drift of the HMD device 110 and the drift of the tracking device 130 are the same, and the user does not feel that the drift is causing the errors of the position of the tracking device 130.

Figure 4:
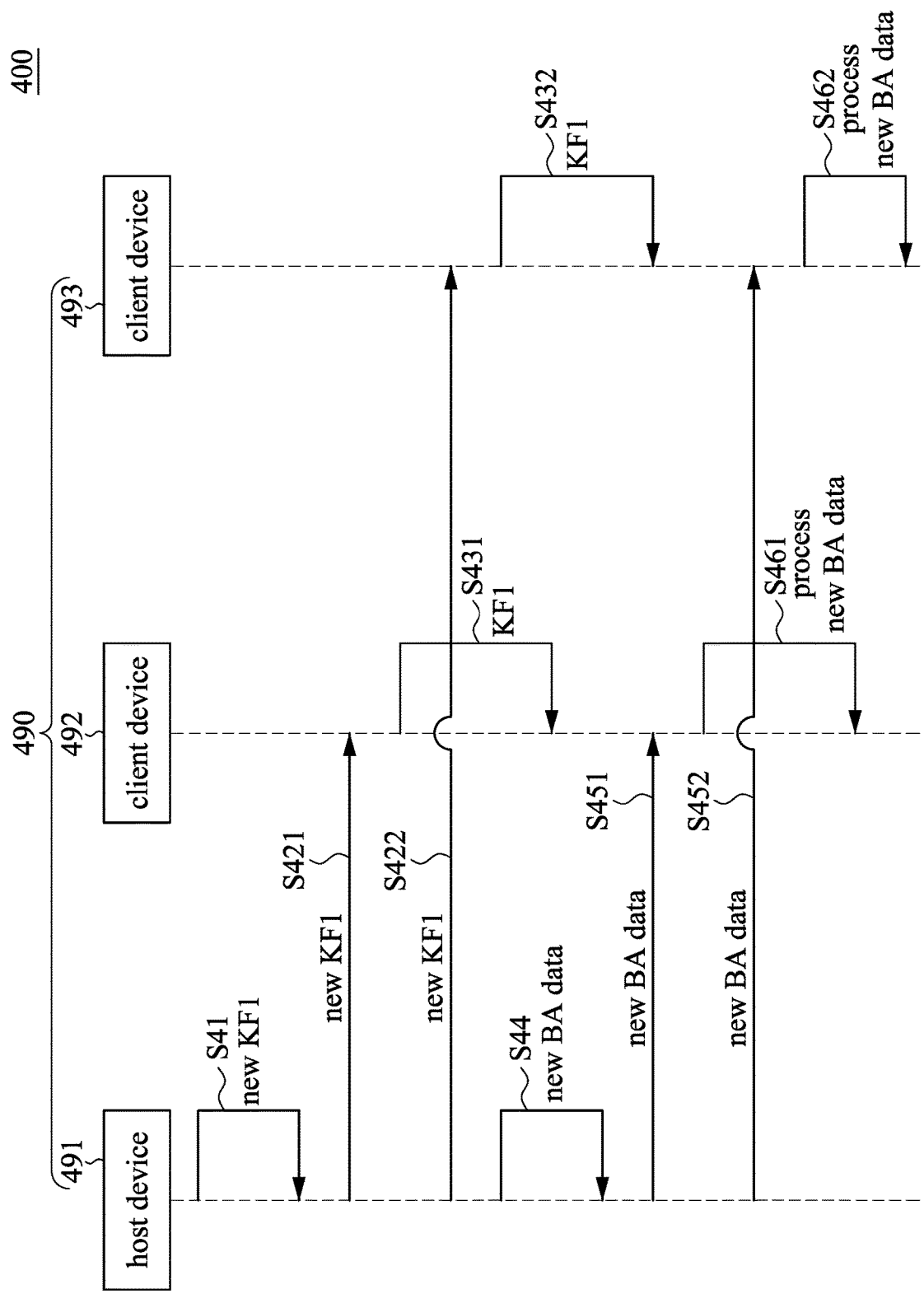
FIG. 4 is a schematic chart diagram illustrating an adjusting method according to some embodiments of the present disclosure.

Reference is made to FIG. 4. FIG. 4 is a schematic chart diagram illustrating an adjusting method 400 according to some embodiments of the present disclosure. As illustrated in FIG. 4, the adjusting method 400 is executed by a virtual reality system 490 with a host device 491, a client device 492, and a client device 493. The operation of the virtual reality system 490 is similar to that of the virtual reality system 100 as illustrated in FIG. 2, the operation of the host device 491 is similar to that of the HMD device 110 as illustrated in FIG. 2, and the operations of the client devices 492, 493 are similar to those of the tracking device 130 as illustrated in FIG. 2. The virtual reality system 490 may be operated in the environment E as illustrated in FIG. 1. Details of the virtual reality system 490 will not be illustrated herein.

In operation S41, the host device 491 generates a new key frame KF1 according to the environment E.

In operation S421, the host device 491 sends the new key frame KF1 to the client device 492.

In operation S422, the host device 491 sends the new key frame KF1 to the client device 493.

In operation S431, the client device 492 stores the new key frame KF1.

In operation S432, the client device 493 stores the new key frame KF1.

In operation S44, the host device 491 performs a bundle adjustment process BA according to the new key frame KF1 and generates a new BA data (host bundle adjustment data).

In operation S451, the host device 491 sends the new BA data to the client device 492.

In operation S452, the host device 491 sends the new BA data to the client device 493.

In operation S461, the client device 492 processes the new BA data to update the map and the location of the client device 492.

In operation S462, the client device 493 processes the new BA data to update the map and the location of the client device 493.

With the adjusting method 400 mentioning above, a consistency between the host map stored in the host device 491, the client map stored in the client device 492, and the client map stored in the client device 493 is maintained with the new host bundle adjustment data generated by the host device. Furthermore, even if the drift occurs in the virtual reality system 100, since the client maps and the host map are updated with the same host bundle adjustment data, the drift of the host device 491, the drift of the client device 492, and the drift of the client device 493 are the same, and the user does not feel that the drift is causing the errors of the position of the client devices 492, 493.

The embodiments of the present disclosure provide a tracking device, a head-mounted display device, and a virtual reality system, by updating the client map and the host map with the same host bundle adjustment data, the drift of the host device and the client device may be the same, and the user does not feel that the drift is causing the errors of the position of the client device.

In some embodiments, the host processor 112 and the client processor 132 can be, but are not limited to being, a single processor or an integration of multiple microprocessors such as CPUs or GPUs. The microprocessors are electrically coupled to the memory to access the at least one instruction. According to the at least one instruction, the above-mentioned adjusting method can be performed. In some embodiments, the memory (the host memory 114 or the client memory 134) can be a flash memory, a HDD, a SSD (Solid State Disk), a DRAM (Dynamic Random Access Memory) or a SRAM (Static Random-Access Memory). In some embodiments, each of the host memory 114 and the client memory 134 can be a non-transitory computer readable medium stored with at least one instruction associated with an adjusting method and further with a SLAM circuit or a SLAM module. The at least one instruction can be accessed and executed by the host processor 112 or the client processor 132.

In addition, it should be noted that in the operations of the above-mentioned adjusting methods 300 and 400, no particular sequence is required unless otherwise specified. Moreover, the operations may also be performed simultaneously, or the execution times thereof may at least partially overlap.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A tracking device, communicatively connected to an HMD device (head-mounted display device), comprising:
   a client processor, configured to obtain an initial map from the HMD device; and
   a client memory, configured to store the initial map;
   wherein the client processor is further configured to update the initial map stored in the client memory to generate a client map according to a host bundle adjustment data sent by the HMD device;
   wherein the client processor is further configured to maintain a consistency between a host map and the client map according to the host bundle adjustment data;
   wherein the host map is generated by updating the initial map according to the host bundle adjustment data.

2. The tracking device of claim 1, wherein the host bundle adjustment data is generated according to a plurality of host key frames of the HMD device.

3. The tracking device of claim 2, wherein the client memory is further configured to store the plurality of host key frames and the host bundle adjustment data.

4. The tracking device of claim 1, wherein the client processor is further configured to not to modify the host bundle adjustment data sent from the HMD device.

5. The tracking device of claim 1, wherein the client processor is further configured to obtain a plurality of client key frames, and wherein the plurality of client key frames are sent from the client processor to the HMD device.

6. The tracking device of claim 5, wherein the host bundle adjustment data is generated according to a plurality of host key frames obtained by the HMD device and the plurality of client key frames.

7. An HMD device, communicatively connected to a tracking device, comprising:
   a host memory, configured to store a SLAM module; and
   a host processor, configured to:
   obtain an initial map with the SLAM module;
   send the initial map to the tracking device;
   obtain a plurality of host key frames;
   perform a bundle adjustment process according to the plurality of host key frames to generate a host bundle adjustment data;
   update the initial map to generate a host map according to the host bundle adjustment data; and
   send the host map to the tracking device for the tracking device to generate a client map by updating the initial map according to the host bundle adjustment data;
   wherein a client processor of the tracking device maintains a consistency between the host map and the client map according to the host bundle adjustment data.

8. The HMD device of claim 7, wherein the host processor is further configured to send the plurality of host key frames to the tracking device.

9. The HMD device of claim 7, wherein the plurality of host key frames comprise a plurality of features of an environment surrounding the HMD device.

10. The HMD device of claim 7, wherein the host processor is further configured to maintain the consistency between the host map and the client map with the host bundle adjustment data.

11. The HMD device of claim 7, wherein the host processor is further configured to receive a plurality of client key frames from the tracking device.

12. The HMD device of claim 11, wherein the host processor is further configured to perform the bundle adjustment process according to the plurality of host key frames and the plurality of client key frames to generate the host bundle adjustment data.

13. A virtual reality system, comprising:
   a HMD device, comprising:
      a host memory, configured to store a SLAM module; and
      a host processor, configured to obtain an initial map with the SLAM module; and
   a tracking device, communicatively connected to the HMD device, comprising:
      a client processor, configured to obtain the initial map from the HMD device; and
      a client memory, configured to store the initial map;
   wherein the host processor is further configured to:
      obtain a plurality of host key frames;
      perform a bundle adjustment process according to the plurality of host key frames to generate a host bundle adjustment data;
      update the initial map to generate a host map according to the host bundle adjustment data; and
      send the host bundle adjustment data to the client processor;
   wherein the client processor is further configured to:
      update the initial map stored in the client memory to generate a client map according to the host bundle adjustment data; and
      maintain a consistency between the host map and the client map according to the host bundle adjustment data.

14. The virtual reality system of claim 13, wherein the host processor is further configured to send the plurality of host key frames to the tracking device.

15. The virtual reality system of claim 14, wherein the client memory is further configured to store the plurality of host key frames.

16. The virtual reality system of claim 14, wherein the client processor is further configured to not to modify the host bundle adjustment data sent from the HMD device.

17. The virtual reality system of claim 13, wherein the plurality of host key frames comprise a plurality of features of an environment surrounding the virtual reality system.

18. The virtual reality system of claim 13, wherein the host processor is further configured to maintain the consistency between the host map and the client map with the host bundle adjustment data.

19. The virtual reality system of claim 13, wherein the host processor is further configured to perform the bundle adjustment process according to the plurality of host key frames and a plurality of client key frames to generate the host bundle adjustment data, wherein the plurality of client key frames are sent from the client processor to the host processor.

* * * * *